US012621211B2

(12) United States Patent
Su et al.

(10) Patent No.: US 12,621,211 B2
(45) Date of Patent: May 5, 2026

(54) BLOCKCHAIN-BASED MULTI-TENANT DISTRIBUTED LEASING METHOD FOR SATELLITE NETWORK RESOURCES

(71) Applicant: CHONGQING UNIVERSITY OF POSTS AND TELECOMMUNICATIONS, Chongqing (CN)

(72) Inventors: Chang Su, Chongqing (CN); Jie Li, Chongqing (CN); Xianzhong Xie, Chongqing (CN)

( * ) Notice: Subject to any disclaimer, the term of this patent is extended or adjusted under 35 U.S.C. 154(b) by 42 days.

(21) Appl. No.: 18/272,583

(22) PCT Filed: Dec. 21, 2022

(86) PCT No.: PCT/CN2022/140615
§ 371 (c)(1),
(2) Date: Mar. 24, 2025

(87) PCT Pub. No.: WO2023/138291
PCT Pub. Date: Jul. 27, 2023

(65) Prior Publication Data
US 2025/0227028 A1 Jul. 10, 2025

(30) Foreign Application Priority Data
Jan. 20, 2022 (CN) .......................... 202210065574.1

(51) Int. Cl.
*H04L 41/0895* (2022.01)
*H04L 12/14* (2024.01)
(Continued)

(52) U.S. Cl.
CPC ...... *H04L 41/0895* (2022.05); *H04L 12/1442* (2013.01); *H04L 41/0893* (2013.01); *H04W 84/06* (2013.01)

(58) Field of Classification Search
None
See application file for complete search history.

(56) References Cited

U.S. PATENT DOCUMENTS 10,068,228 B1 * 9/2018 Winklevoss ........... G06Q 20/34
2017/0116693 A1 * 4/2017 Rae ...................... G06Q 50/184
(Continued)

FOREIGN PATENT DOCUMENTS

CN          109544334 A       3/2019
CN          110062359 A       7/2019
(Continued)

OTHER PUBLICATIONS

Notice of Grant of Patent Right of corresponding CN Application 202210065574.1, published on Apr. 26, 2024.
(Continued)

*Primary Examiner* — Ranodhi Serrao
(74) *Attorney, Agent, or Firm* — Michael D. Eisenberg; MDE Patents

(57) ABSTRACT

The present invention relates to a blockchain-based multi-tenant distributed leasing method for satellite network resources, which belongs to the field of mobile communication. The method includes: S1: constructing a multi-tenant business ecosystem for satellite network resource leasing; S2: constructing a blockchain-based leasing mechanism for satellite network resources, specifically: S21: constructing a dual leasing mechanism for satellite network resources; S22: constructing a blockchain-based resource leasing mechanism; S23: obtaining reputation value of a participant: first calculating reputation score of the participant, then combining transaction fees to ensure honesty of the participant, and finally using a sliding window to ensure that the selected leader is an honest participant who contributes consistently. The present invention combines reputation with a blockchain-based leasing mechanism to prevent intermediate enti-
(Continued)

ties from manipulating transaction results, which improves the transaction throughput of the system and reduces transaction latency.

6 Claims, 2 Drawing Sheets

(51) Int. Cl.
    *H04L 41/0893*        (2022.01)
    *H04W 84/06*        (2009.01)

(56)           References Cited

U.S. PATENT DOCUMENTS

| | | | | |
|---|---|---|---|---|
| 2018/0018723 | A1* | 1/2018 | Nagla | H04L 63/102 |
| 2018/0217898 | A1* | 8/2018 | Tormasov | G06Q 20/42 |
| 2018/0225448 | A1* | 8/2018 | Russinovich | H04L 63/123 |
| 2018/0225661 | A1* | 8/2018 | Russinovich | G06F 21/53 |
| 2018/0227275 | A1* | 8/2018 | Russinovich | H04L 63/08 |
| 2018/0308108 | A1* | 10/2018 | Shigeru | H04W 8/18 |
| 2018/0330343 | A1* | 11/2018 | Gray | G06Q 20/3829 |
| 2018/0332011 | A1* | 11/2018 | Gray | H04L 9/0841 |
| 2020/0005388 | A1 | 1/2020 | Lim et al. | |
| 2021/0288918 | A1 | 9/2021 | Sciancalepore et al. | |
| 2021/0342329 | A1 | 11/2021 | Padmanabhan | |

FOREIGN PATENT DOCUMENTS

| | | | |
|---|---|---|---|
| CN | 110546636 | A | 12/2019 |
| CN | 112543115 | A | 3/2021 |
| CN | 112819594 | A | 5/2021 |
| CN | 113056760 | A | 6/2021 |
| CN | 113328782 | A | 8/2021 |
| WO | WO2021230948 | A2 | 11/2021 |

OTHER PUBLICATIONS

The grant claims of corresponding CN application 202210065574. 1.

Jie Li, Research on Resource Leasing Method of Multi-tenant Satellite Network Based on Blockchain, China Excellent Master's Theses Full-text Database—Information Technology Series, vol. 2023, Issue No. 06, Jun. 15, 2023, p. I136-349.

\* cited by examiner

BLOCKCHAIN-BASED MULTI-TENANT DISTRIBUTED LEASING METHOD FOR SATELLITE NETWORK RESOURCES

TECHNICAL FIELD

The present invention includes techniques for mobile communication and particularly relates to a blockchain-based multi-tenant distributed leasing method for satellite network resources.

BACKGROUND

With the increasing applications of SDN/NFV technology in satellite network architecture, the emergence of new business models facilitates satellite operators to share satellite network capacity with various tenants in a flexible manner. In such a multi-participant, non-fully trusted environment, how to achieve secure and reliable transactions while meeting economic benefits is a critical issue.

Several schemes have been proposed in many literatures to implement multi-participant scheduling and management of network resources. Typical business processes in the communications industry include economic models (e.g., auctions) aimed at solving resource management problems using pricing and allocation mechanisms. The main goal of these mechanisms, including slicing (resource) brokerage, is to efficiently allocate available resources to parties with the most critical needs while ensuring the tamper-proof capability of the scheme. Scheme I: 5G network slicing broker: a blockchain-based distributed marketplace. Kibalya et al. propose an agent system that uses reinforcement learning algorithms to assign resource requests to different network operators based on constraints such as latency and geographic location. Scheme II is a distributed blockchain-based agent for efficient resource allocation in 5G networks. In the paper "Distributed Blockchain-Based Agents for Efficient Resource Allocation in 5G Networks", the authors propose the use of a stream-level slicing agent with iterative double auctions that consider transaction costs. In their software-defined network (SDN)-based architecture, the SDN controller acts as a broker and schedules two-sided auctions. The effectiveness and eventual convergence of their proposed iterative auction algorithm is demonstrated through simulations. In the paper "In Our Trusted Brokers: A Double Auction Approach for Resource Allocation in NFV Markets", a double auction algorithm is proposed to solve the problem of service function link routing and network function virtualization (NFV) price adjustment. The NFV broker acts as a central auctioneer who receives bids and offers from customers/suppliers and then determines the allocation and pricing of resources.

However, there are two main drawbacks to these approaches. First, the increasing number of operators and/or tenants in Scheme I may overwhelm the brokers as they are centralized. This would reduce the performance of the entire ecosystem. Second, in Scheme II, the common assumption is that there is an impartial central authority that can be trusted to operate the market and execute business processes without manipulating the results for its own or another party's benefit.

To solve the above problems, the present invention combines blockchain technology with smart contracts to provide a distributed alternative to the traditional centralized slicing brokerage method.

INVENTION CONTENT

In view of this, the present invention is to provide a blockchain-based multi-tenant distributed leasing method for satellite network resources that combines reputation with a blockchain-based leasing mechanism to prevent intermediate entities from manipulating transaction results and to improve the transaction throughput of the system to reduce transaction latency.

To achieve the above purpose, the present invention provides the following technical solutions:

A blockchain-based multi-tenant distributed leasing method for satellite network resources, in which there are two actors: the resource owner and the resource demander, which together form a coalition. In this invention, the resources are seen as commodities circulating on the coalition, and the use of blockchain technology achieves a safe and secure transaction while satisfying economic benefits in a non-fully trusted environment, as well as a tamper-proof record-keeping system. The method specifically includes the following steps:

S1: constructing a multi-tenant business ecosystem for satellite network resource leasing;

S2: constructing a blockchain-based leasing mechanism for satellite network resources, specifically:

S21: constructing a dual leasing mechanism for satellite network resources;

S22: constructing a blockchain-based resource leasing mechanism;

S23: obtaining reputation value of participant: first calculating reputation score of the participant, then combining transaction fees to ensure honesty of the participant, and finally using a sliding window to ensure that the selected leader is an honest participant who contributes consistently.

Further, in S1, constructing the multi-tenant business ecosystem for satellite network resource leasing specifically includes: satellite network operators and tenants obtain identity proofs, i.e., public key certificates, from trusted third parties; member service provider (MSP) is a trusted institution in Fabric; meanwhile, participants digitally sign a settle-in contract, i.e., a smart contract, which specifies rights and obligations of partners and sanctions that can be applied in case of infringement; resource demanders have the right to issue their resource demands, and satellite network resource owners have the right to issue a list of resources they can provide, both of which have right to issue proposals via competition leader; if demand matching between two parties is successful, the partners are obliged to perform services as required by agreed service level agreement (SLA);

a series of smart contracts, i.e., chaincodes, are deployed using Fabric; before deploying the chaincodes to the channel, members of the channel agree on chaincode definition for establishing chaincode governance; when the required number of organizations is satisfied, the chaincode definition is submitted to the channel and then the chaincodes are available; in this ecosystem, endorsement policy used is N-out-of-N, i.e., all nodes must be endorsed.

Further, in S21, constructing a dual leasing mechanism for the satellite network resources specifically comprises:

S211: defining key factors of the satellite network resource provider and the resource demander for the virtual network function resource, including the resource type and the performance index;

S212: grouping according to resource IDs and ranking bids and prices of all participants in each group;

S213: for each group, a requirement to find the point C with the maximum feasible number of transactions, as well as constraints on the number of transactions and performance indexes, while satisfying Walrasian equilibrium and resource demand side's requirements on the key factors of the resource;

S214: determining trader payment value $\beta$ using prices of the strongest non-trading seller and the strongest non-trading buyer to obtain the trading price;

S215: when identifying list of buyers and sellers with successful trades, the leader matches resource allocation according to the buyer's reputation value.

Further, S211 specifically includes: assigning resource IDs for different types of virtual network functions to identify:

$$\widetilde{ID} = \{id_1, id_2, \ldots, id_u\};\qquad(1)$$

for expected performance indexes on the demand side of the resource, use $\widetilde{Q_D}$ to express:

$$\tilde{Q}_D = \{Q_1^D, Q_2^D, \ldots, Q_j^D, \ldots, Q_m^D\};\qquad(2)$$

wherein $$Q_j^D = \left\{q_j^{D_{bit}}, q_j^{D_{loss}}, q_j^{D_{delay}}\right\}$$

denotes the expected performance of the resource required by the jth resource demander, and $$q_j^{D_{bit}}, q_j^{D_{loss}} \text{ and } q_j^{D_{delay}}$$

respectively denote requirements of bit rate, packet loss rate, and transmission delay proposed by the j-th resource demander; $id_u$ denotes identification of a virtual network function by a participant in a transaction, u denotes the total number of virtual network function types, and m denotes the total number of satellite network resource demanders.

Further, S212 specifically includes:

for the set of satellite network resource providers L:

$$L = \{l_1, l_2, \ldots, l_i, \ldots, l_n\}: v_1^L \le v_2^L \le \ldots \le v_n^L;\qquad(3)$$

for the set of resource demanders D:

$$D = \{d_1, d_2, \ldots, d_j, \ldots, d_m\}: v_1^D \ge v_2^D \ge \ldots \ge v_m^D;\qquad(4)$$

wherein L denotes the satellite network resource providers, D denotes the resource demanders, $l_i$ denotes the i-th satellite network resource provider, $d_j$ denotes the j-th satellite network resource demander, $$v_n^L$$

denotes the offer price of the n-th satellite network resource provider, $$v_m^D$$

denotes the offer price of the m-th satellite network resource demander, and n denotes the number of satellite network resource providers. Equation (3) shows the resource providers in ascending order of asking price, and Equation (4) shows the resource demanders in descending order of resource bids.

Further, S213 specifically includes:

for each group, while satisfying the Walrasian equilibrium and the resource demander's requirements for the key factors of the resource, it is required to find the point C with the maximum feasible number of transactions, wherein there are S offers and K bids, at which the prices on both sides of the point satisfy:

$$v_K^D \ge v_S^L \text{ and } v_{K+1}^D \le v_{S+1}^L;\qquad(5)$$

and the number of transactions and performance indexes respectively satisfy equation (6) and equation (7):

$$\sum_{j=1}^{K} N_j^D \le \sum_{i=1}^{S} N_i^L;\qquad(6)$$

$$q_{min}^{bit} \times N_j^D \ge q_i^{D_{bit}} \text{ and } q_{min}^{loss} \times N_j^D \le q_i^{D_{loss}} \text{ and } q_{min}^{delay} \times N_j^D \le q_i^{D_{delay}};\qquad(7)$$

wherein $$q_{min}^{bit}, q_{min}^{loss} \text{ and } q_{min}^{delay}$$

respectively denote the minimum bit rate, packet loss rate, and transmission delay of each virtual network function resource provided by the satellite network resource provider, $$N_i^L$$

denotes the number of resources successfully traded by the i-th satellite network resource provider, and $$N_j^D$$

denotes the number of resources successfully traded by the j-th resource demander. The "Walrasian equilibrium" defines another important factor, the "Walrasian price", which, if traded, brings positive benefits to both the supply and demand sides and balances the budget, i.e., $\Theta U$ in the figure; at the same time, it satisfies the expected performance requirements of the resource demander under our constraints.

Further, the expression for the trader payment value $\beta$ in S214 is:

$$\beta = \frac{1}{2} \times (v_{S+1}^L + v_{K+1}^D) \in [v_i^L, v_j^D];\qquad(8)$$

wherein $$v^L_{S+1}$$

denotes the highest price of the non-traded seller, i.e., $$v^D_{K+1}$$

denotes the highest price of the non-traded buyer;

① if β belongs to $$[v^L_S, v^D_K],$$

the number of transactions is $$\min\left(\sum_1^{i=S} N^L_i, \sum_1^{j=K} N^D_j\right),$$

and the transaction price $P^L=P^D=\beta$, wherein $P^L$ and $P^D$ respectively denote the final transaction prices agreed upon by the satellite network resource provider and the satellite network resource demander;

② if β does not belong to $$[v^L_{S_J}, v^D_K],$$

the number of transactions is $$\min\left(\sum_1^{i=S} N^L_i, \sum_1^{j=K} N^D_j\right),$$

and the transaction prices are $$P^L = v^L_s, P^D = v^D_K.$$

Further, S215 specifically includes: in confirming the list of successful buyers and sellers for the transaction, there may be multiple buyers who offer the same price and meet the transaction price, i.e.:

$$v^L_i = v^D_j \text{ and } v^L_i \leq P^L \text{ and } v^D_j \leq P^D; \qquad (9)$$

at this point, the leader will match their reputation value to allocate resources to which buyer, if the reputation value R meets $$r^R_i < r^R_j,$$

then the resources will be allocated to j; if the reputation value R meets $$r^R_i > r^R_j,$$

then the resources will be allocated to i.

Further, constructing the blockchain-based resource leasing mechanism in S22 specifically includes:

S221: based on reputation value, selecting a leader from the participants with greater reputation value compared with the average reputation value;

S222: the leader initiates a transaction proposal containing a table of bids and a table of reputation values for lessors and renters, resource IDs, the number of available/demanded resources proposed by each participant and their corresponding performance indexes, and the results and the number of transactions running a dual leasing mechanism for satellite network resources within the participants;

S223: the transaction proposal is broadcasted to each blockchain member's peer which is a fundamental component of any Fabric network; the peer stores the blockchain ledger and validates the transaction before committing it to the ledger;

S224: transactions are sent to the Order node for sorting, where consensus is reached and finally a block is created and submitted to the ledger.

Further, in S221, first, a leader is selected using the leader algorithm, wherein a sliding window is used to compute the cumulative reputation score.

Further, the reputation score $r_i$ of participant i in S23 is calculated by the formula:

$$r_i = \sum_{k=1}^{l} S(k) * Z(k);$$

wherein l is the number of transactions generated after the previous block, Z(k) is the value of transaction k, and S(k) is the scaling factor.

The benefits of the present invention are that the invention combines reputation with a blockchain-based leasing mechanism to improve the transaction throughput of the system to reduce transaction latency, thereby enhancing security and providing the desired incentives. The specific beneficial effects are as follows:

1. The present invention introduces blockchain into the process of satellite network resource leasing and proposes a blockchain-based architecture for multi-tenant distributed satellite network resource transactions as a way to achieve a distributed leasing mechanism and prevent intermediate entities from manipulating the transaction results.

2. The present invention adopts a variant of the dual auction mechanism as a smart contract; it also introduces a proposal issuer selection scheme based on reputation value and determines the list of successful buyers and sellers of the transaction based on the reputation value at the end.

Other advantages, objectives and features of the present invention will be illustrated in the following description and will be apparent to those skilled in the art based on the following investigation or can be taught from the practice of the present invention.

DESCRIPTION OF DRAWINGS

To enable the purpose, the technical solution and the advantages of the present invention to be more clear, the present invention will be preferably described in detail below in combination with the drawings, wherein.

DETAILED DESCRIPTION

Embodiments of the present invention are described as follows. Those skilled in the art can understand the related advantages and effects of the present invention through the disclosure of the description. The present invention can also be implemented or applied with additional specific embodiments. All details in the description can be modified or adapted based on different perspectives and applications without departing from the essential content of the present invention. It should be noted that the figures provided in the following embodiments only exemplarily explain the basic conception of the present invention, and if there is no conflict, the following embodiments and their features can be mutually combined.

Figure 1:
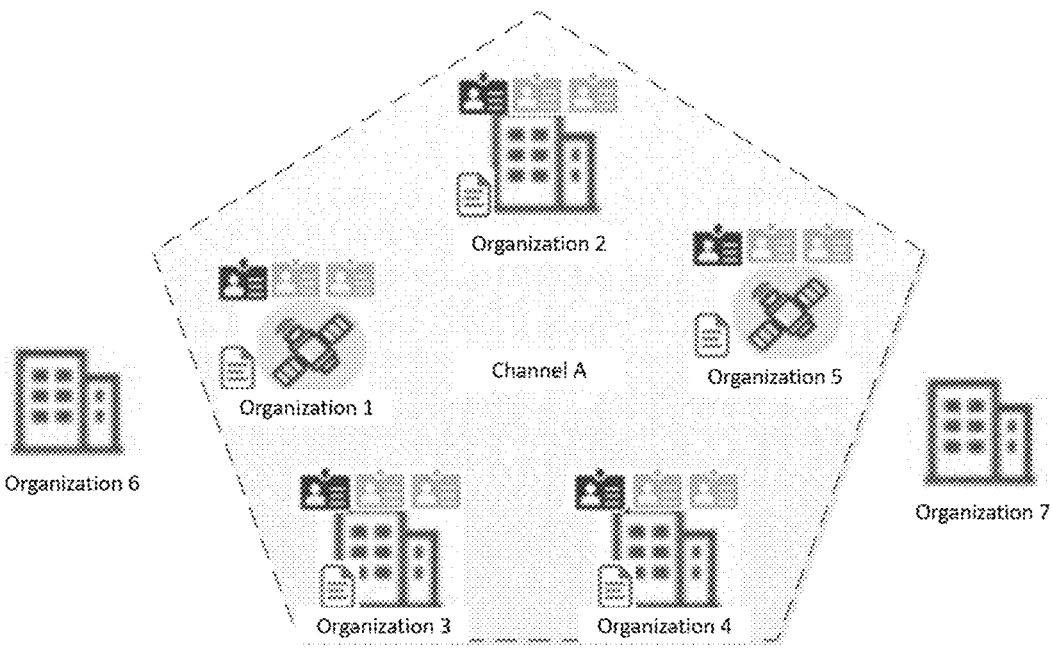
FIG. 1 is a schematic diagram of a multi-tenant business ecosystem for satellite network resource leasing.
Figure 2:
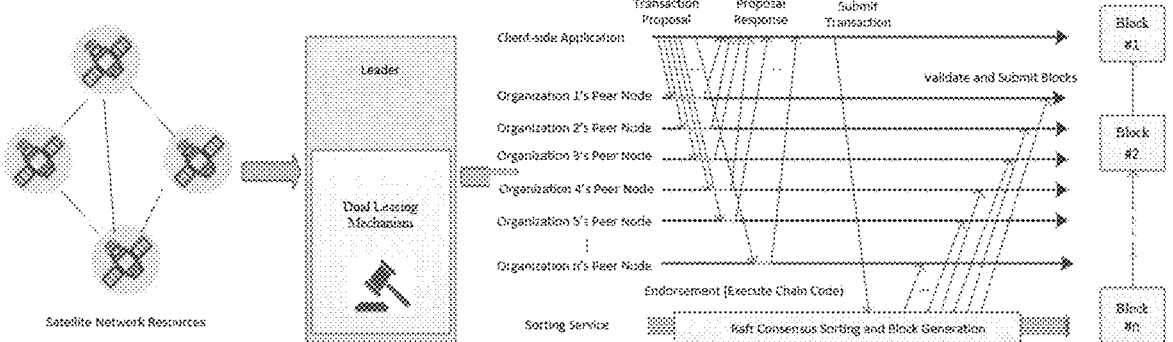
FIG. 2 is a diagram of a multi-tenant distributed satellite network resource transaction architecture.
Figure 3:
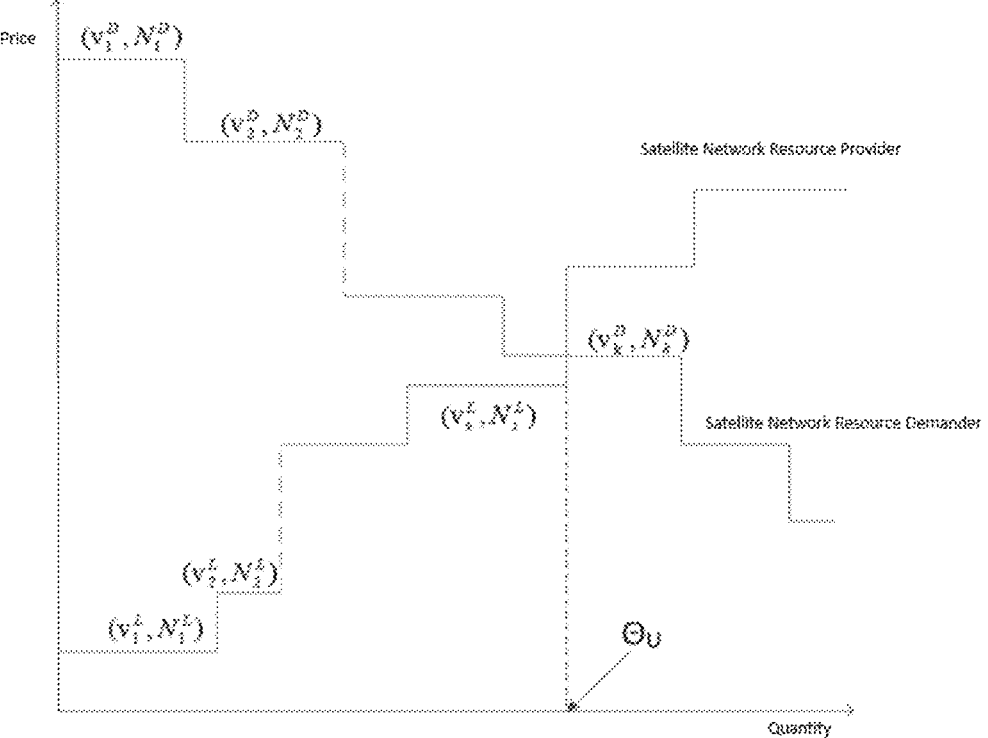
FIG. 3 is a schematic diagram of the price change of the dual leasing mechanism employed in the present invention.

As shown in FIG. 1 to FIG. 3, the present invention proposes a blockchain-based multi-tenant distributed leasing method for satellite network resources, in which there are two actors: the resource owner and the resource demander, which together form a coalition. In this invention, the resources are seen as commodities circulating on the coalition, and the use of blockchain technology achieves a safe and secure transaction while satisfying economic benefits in a non-fully trusted environment, as well as a tamper-proof record-keeping system. The method specifically includes the following steps:

S1: constructing a multi-tenant business ecosystem for satellite network resource leasing;

As shown in FIG. 1, FIG. 1 illustrates a multi-tenant business ecosystem for satellite network resource leasing. To join the system, satellite network operators and tenants need to obtain identity proofs, i.e., public key certificates, from trusted third parties; member service provider (MSP) is a trusted institution in Fabric; meanwhile, participants digitally sign a settle-in contract, i.e., a smart contract, which specifies rights and obligations of partners and sanctions that can be applied in case of infringement; resource demanders have the right to issue their resource demands, and satellite network resource owners have the right to issue a list of resources they can provide, both of which have right to issue proposal via competition leader; if demand matching between two parties is successful, the partners are obliged to perform services as required by agreed service level agreement (SLA);

a series of smart contracts, i.e., chaincodes, are deployed using Fabric; before deploying the chaincodes to the channel, members of the channel agree on chaincode definition for establishing chaincode governance; when the required number of organizations is satisfied, the chaincode definition is submitted to the channel and then the chaincodes are available; in this ecosystem, endorsement policy used is N-out-of-N, i.e., all nodes must be endorsed.

The architecture of blockchain-based multi-tenant distributed resource transactions in the entire coalition is shown in FIG. 2, and the specific process for resource owners is detailed in S2.

S2: constructing a blockchain-based leasing mechanism for satellite network resources, specifically:

S21: constructing a dual leasing mechanism for satellite network resources.

Various resources on a satellite network can be virtualized to generate an end-to-end full virtual satellite network or some combination/single virtual network function, while also including infrastructure. It is an important objective of the present invention to realize safe and secure transactions of these resources among the participants while satisfying the economic benefits in a multi-participant, non-fully trusted environment. Considering that the transaction process of the present invention is a bilateral trade process with multiple providers and multiple demanders, the present invention considers the requirements of resource demanders for expected performance indexes of resources based on a blockchain-based distributed marketplace, classifies and identifies different resources to facilitate the leasing process of multiple resources at the same time, and also introduces reputation values in the case of insufficient/sufficient resources as a way to determine who can buy/sell the VNFs and other resources.

The invention defines a minimum performance index $$Q_{min} = \left\{ q_{min}^{bit}, q_{min}^{loss}, q_{min}^{delay} \right\}$$

for each virtual network function resource type, and its size is negotiated by the members of the resource coalition. We know that the satellite network resource provider does not really divide the resources when proposing the number of virtual network functions and their prices. According to $Q_{min}$, in each transaction, a satellite network resource provider can propose the number of virtual network functions with a performance index of $Q_{min}$. The virtual/terrestrial network operators then compute how many virtual network functions with $Q_{min}$ performance indexes they needs based on their performance requirements for virtual network functions. In the transaction process, we try our best to let the resource demander get the resources from the same satellite network resource provider through the leasing mechanism, so that the resource demander can request the satellite network resource provider to combine the resources. The leasing mechanism used in the present invention is a mechanism for trading homogeneous resources and is executed in the following steps:

S211: defining key factors of the satellite network resource provider and the resource demander for the virtual network function resource, including the resource type and the performance index;

assigning resource IDs for different types of virtual network functions to identify:

$$\widetilde{ID} = \{id_1, id_2, \dots, id_n\}; \tag{1}$$

for expected performance indexes on the demand side of the resource, use $\widetilde{Q}_D$ to express:

$$\widetilde{Q}_D = \{Q_1^D, Q_2^D, \dots, Q_j^D, \dots, Q_m^D\}; \tag{2}$$

wherein $$Q_j^D = \left\{ q_j^{D_{bit}}, q_j^{D_{loss}}, q_j^{D_{delay}} \right\}$$

9 denotes the expected performance of the resource required by the jth resource demander, and $$q_j^{D_{bit}}, q_j^{D_{loss}} \text{ and } q_j^{D_{delay}} \quad 5$$

respectively denote requirements of bit rate, packet loss rate, and transmission delay proposed by the j-th resource demander; $id_u$ denotes identification of a virtual network function by a participant in a transaction, u denotes the total number of virtual network function types, and m denotes the total number of satellite network resource demanders.

S212: grouping according to resource IDs and ranking bids and prices of all participants in each group;
for the set of satellite network resource providers L:

$$L = \{l_1, l_2, \dots, l_i, \dots, l_n\}: v_1^L \le v_2^L \le \dots \le v_n^L; \quad (3)$$

for the set of resource demanders D:

$$D = \{d_1, d_2, \dots, d_j, \dots, d_m\}: v_1^D \ge v_2^D \ge \dots \ge v_m^D; \quad (4)$$

wherein L denotes the satellite network resource providers, D denotes the resource demanders, $l_i$ denotes the i-th satellite network resource provider, $d_j$ denotes the j-th satellite network resource demander, $$v_n^L$$

denotes the offer price of the n-th satellite network resource provider, $$v_m^D$$

denotes the offer price of the m-th satellite network resource demander; n denotes the number of satellite network resource providers, and m denotes the total number of satellite network resource demanders.

S213: for each group, while satisfying the Walrasian equilibrium and the resource demander's requirements for the key factors of the resource, it is required to find the point C with the maximum feasible number of transactions, wherein there are S offers and K bids, at which the prices on both sides of the point satisfy:

$$v_K^D \ge v_S^L \text{ and } v_{K+1}^D \le v_{S+1}^L; \quad (5)$$

and the number of transactions and performance indexes respectively satisfy equation (6) and equation (7):

$$\sum_{j=1}^K N_j^D \le \sum_{i=1}^S N_i^L; \quad (6)$$

$$q_{min}^{bit} \times N_j^D \ge q_i^{D_{bit}} \text{ and } q_{min}^{loss} \times N_j^D \le q_i^{D_{loss}} \text{ and } q_{min}^{delay} \times N_j^D \le q_i^{D_{delay}}; \quad (7)$$

10 wherein $$q_{min}^{bit}, q_{min}^{loss} \text{ and } q_{min}^{delay}$$

respectively denote the minimum bit rate, packet loss rate, and transmission delay of each virtual network function resource provided by the satellite network resource provider, $$N_i^L$$

denotes the number of resources successfully traded by the i-th satellite network resource provider, and $$N_j^D$$

denotes the number of resources successfully traded by the j-th resource demander. The "Walrasian equilibrium" defines another important factor, the "Walrasian price", which, if traded, brings positive benefits to both the supply and demand sides and balances the budget, i.e., θU in the FIG. 3; at the same time, it satisfies the expected performance requirements of the resource demander under our constraints.

S214: to find the value of β and try to minimize the number of reduced transactions without losing economic characteristics, the invention refers to the technique used in the paper "5G Network Slicing Brokerage: A Blockchain-Based Distributed Marketplace", which uses the values of $L_{S+1}$ (strongest non-traded seller) and $D_{K+1}$ (strongest non-traded buyer) to determine the trader payment value β;
the expression for the trader payment value β is:

$$\beta = \frac{1}{2} \times (v_{S+1}^L + v_{K+1}^D) \epsilon [v_i^L, v_j^D]; \quad (8)$$

wherein $$v_{S+1}^L$$

denotes the highest price of the non-traded seller, i.e., $$v_{K+1}^D$$

denotes the highest price of the non-traded buyer; since $$v_{S+1}^L, v_{K+1}^D$$

and usually no trading participants play a role in price determination, no traders need to be eliminated, including $L_S$ and $D_K$, so the number of reduced trades is zero. The price of the trade is obtained as following:
① if β belongs to 11 12

$$[v_S^L, v_K^D],$$

the number of transactions is $$\min\left(\sum_1^{i=S} N_i^L, \sum_1^{j=K} N_j^D\right),$$

and the transaction price $P^L = P^D = \beta$, wherein $P^L$ and $P^D$ respectively denote the final transaction prices agreed upon by the satellite network resource provider and the satellite network resource demander;

②if $\beta$ does not belong to $$[v_S^L, v_K^D],$$

the number of transactions is $$\min\left(\sum_1^{i=S} N_i^L, \sum_1^{j=K} N_j^D\right),$$

and the transaction prices are $$P^L = v_S^L, P^D = v_K^D.$$

S215: in confirming the list of successful buyers and sellers for the transaction, there may be multiple buyers who offer the same price and meet the transaction price, i.e.:

$$v_i^L = v_j^D \text{ and } v_i^L \le P^L \text{ and } v_j^D \le P^D; \qquad (9)$$

at this point, the leader will match their reputation value to allocate resources to which buyer, if the reputation value R meets $$r_i^R < r_j^R,$$

then the resources will be allocated to j; if the reputation value R meets $$r_i^R > r_j^R,$$

then the resources will be allocated to i.

S22: constructing a blockchain-based resource leasing mechanism;

Based on the HyperLedger Fabric platform, a distributed smart contract is operated and verified by all interested parties according to the mechanism built in S21, which enables multiple traders on the demand side and the provide side to trade their resources. The dual leasing smart contract mechanism not only eliminates the possibility of manipulation by intermediate host entities but also decouples the final transaction price from the original lessor/lessor to ensure that no trader can develop any strategy to manipulate the outcome of the transaction in terms of price. It also realizes optimal allocation, incentive compatibility, individual rationality, weak budget balance and optimal allocative efficiency. The blockchain-based bidding process is as follows:

S221: first, based on the reputation value, a leader is selected from the participants whose reputation is greater than the reputation average. The participant sends a bid to the leader by means of a private message set, and the leader returns a credential signed time-stamped record to the participant. When the specified time T is reached, the leader submits a deal proposal based on the statistical information.

A leader is selected based on the leader selection algorithm. Decay is an important feature of reputation schemes, so we use a sliding window w to compute the cumulative reputation score $R^w$. Specifically, the validator uses a random generator RNG from a random seed to generate random numbers. Such seeds can be generated using a secure distributed bias-resistant random generation protocol. First, participants with reputation scores above the median have the opportunity to be selected as leaders. Then each participant will calculate $O_j$, and finally the participant with the lowest value is selected as the leader.

The leader selection algorithm is:

input: random seed Seed$^e$ and cumulative reputation scores over the past W specific time periods T:

$$R^W = r_1^W + r_2^W + \ldots + r_n^W;$$

output:
there are K participants $P = \{P_1, P_2, \ldots, P_k\}$;
Set the seed of the random generator RNG to Seed$^e$;
rm is the median of a subset of $R^w$;
for each participant $P_j \in P$;
If $$rm \le r_j^W,$$

then
a random floating-point number $0 \le y \le 1$ is generated from the RNG;

$$o_j = y/r_j^W;$$

Otherwise $$o_j = +\infty;$$

Leader=$P_i$, wherein $o_j = \min(o_1, o_2, \ldots, o_m)$.

S222: the leader initiates a transaction proposal containing a table of bids and a table of reputation values for lessors and renters, resource IDs, the number of available/demanded resources proposed by each participant and their corresponding performance indexes, and the results and the number of transactions running a dual leasing mechanism for satellite network resources within the participants;

S223: the transaction proposal is broadcasted to each blockchain member's peer which is a fundamental component of any Fabric network; the peer stores the blockchain ledger and validates the transaction before committing it to the ledger; peers run smart contracts that contain the business logic used to manage assets on the blockchain ledger.

When the node receives the proposal, it starts simulating the execution of the proposed transaction and generates the read/write set. The endorsement process starts in this process by executing the chaincode to realizing the resource leasing mechanism. If the nodes execute the smart contract to produce a resource allocation result that matches the proposed result, they endorse the transaction by returning the signed transaction. The endorsement strategy is given in the problem definition module. Participating nodes execute the chaincode to start the endorsement and check the bid table at the same time. If the Leader is found to have fake behavior, the victim can send a warning to all other participants. All honest verifiers increase the victim's reputation score and pass this information to the Leader. If the malicious Leader refuses to add the victim's reputation score, the reputation value tables for the malicious Leader and the honest participant will be different.

S224: transactions are sent to the Order node for sorting, where consensus is reached and finally a block is created and submitted to the ledger.

This distributed process replaces the traditional centralized approach to resource leasing where a single institution has no control over the entire behavior of the coalition. Coupled with the presence of reputation values and incentives, there is a small probability that an incomplete bid/ask table will occur.

S23: obtaining reputation value of participant: at the end of a proposal consensus, all participants can individually and uniformly calculate the reputation score based on the warn message and the confirmed transaction blocks. The reputation score $r_i$ of participant i is calculated by the formula:

$$r_i = \sum_{k=1}^{l} S(k) * Z(k);$$

wherein l is the number of transactions generated after the previous block, Z(k) is the value of transaction k, and S(k) is the scaling factor. The invention introduces Z(k) (the value of transaction k) to prevent participants from being honest about low-value transactions but dishonest about high-value transactions. The scaling factor S(k) is used to reward or punish different behaviors. A reputation score of {−1, 0, 1} is simply provided for correct, unknown and incorrect decisions. However, even if a participant is dishonest from time to time, it can still make substantial profits. Therefore, our system sets different scaling factors for different behaviors.

Considering that the super-ledger used in the present invention has no built-in tokens, in order to motivate and compensate honest people, the concept of transaction fees is added to the system of the present invention, which will be collected from the owners who participate in the transactions. Half of the transaction fee is allocated to the leader and the rest is allocated to the other participants based on the reputation score they have obtained in the current period. Also, if there was a surplus in the previous period T, it is distributed based on the reputation value. Thus, even a newly joined node can earn reputation score and receive a stable income under our scheme, as long as it is honest and works hard. A malicious node may occasionally cheat the system by being dishonest. However, on the one hand, such a node gains fewer reputation score than the honest majority, so it has little chance to become a leader and threaten the system. On the other hand, it also receives much less reward than others in the process, i.e., occasional cheating is not a good strategy for benefit. Therefore, it is believed that rational nodes will not adopt dishonest practices. In addition, an appropriate sliding window w is used to ensure that the chosen leader is an honest node that contributes consistently. At the same time, w should not be large to prevent monopoly. The considerable profits of being a leader will encourage participants to trade honestly.

The above descriptions are only examples of the invention, and are not used to limit the protection scope of the invention. For those skilled in the art, the application can have various modifications and changes. Any modification, equivalent replacement and improvement made within the core content and principle of this invention shall be included in the protection scope of this invention.

The invention claimed is:

1. A blockchain-based multi-tenant distributed leasing method for satellite network resources, the method comprising:

S1: constructing a multi-tenant business ecosystem for satellite network resource leasing, wherein satellite network operators and tenants obtain identity proofs, in the form of public key certificates, from trusted third parties; wherein a member service provider (MSP) is a trusted institution in Fabric; wherein a plurality of participants digitally sign a settle-in contract, implemented as a smart contract, which specifies rights and obligations of partners and sanctions that are applied in case of infringement; where in a plurality of resource demanders have the right to issue their resource demands, and satellite network resource providers have the right to issue a list of resources they can provide, both of which have right to issue proposal via a respective competition leader; wherein if the demands matching between two parties is successfully established, the partners are obliged to perform services as required by an agreed service level agreement (SLA); wherein a series of smart contracts are chaincodes that are deployed within the Fabric network;

wherein before deploying the chaincodes to a channel, members of the channel agree on a chaincode definition for establishing chaincode governance; when a required number of organizations is satisfied, the chaincode definition is submitted to the channel and then the chaincodes are available;

wherein an N-out-of-N endorsement policy is applied in the ecosystem, in which all nodes are required to provide endorsement;

S2: constructing a blockchain-based leasing mechanism for satellite network resources, wherein the step S2 further comprises:

S21: constructing a dual leasing mechanism for satellite network resources, wherein the step S21 further comprises:

S211: defining key factors of the satellite network resource provider and the resource demander for virtual network function resources, including a resource type and a performance index;

S212: grouping according to resource IDs and ranking bids and prices of all participants in each group;

S213: for each group, determining a point C which represents a maximum feasible number of transaction under constraints of the number of transactions and performance indexes, while satisfying a Walrasian equilibrium and resource demander's requirements for key resource factors;

S214: determining trader payment value β using prices of the strongest non- trading seller and the strongest non-trading buyer to obtain a trading price;

S215: when identifying a plurality of list of buyers and sellers with successful trades, the competition leader matches resource allocation according to the buyer's reputation value;

S22: constructing a blockchain-based resource leasing mechanism, wherein the step S22 further comprises:

S221: based on reputation value, selecting the competition leader from the participants with greater reputation value compared with the average reputation value;

S222: wherein the competition leader initiates a transaction proposal containing a table of bids and a table of reputation values for lessors and renters, resource IDs, the number of available/demanded resources proposed by each participant and their corresponding performance indexes, and numbers of transactions running the dual leasing mechanism for satellite network resources within the participants;

S223: wherein the transaction proposal is broadcasted to each blockchain member's peer which is a fundamental component of any Fabric network; the peerstores a blockchain ledgerand validates the transaction before committing it to the blockchain ledger;

S224: wherein transactions are sent to an Order node for sorting, where consensus is reached, and a block is subsequently generated and committed to the blockchain ledger;

S23: obtaining a reputation value of participant by first calculating a reputation score of the participant, then combining transaction fees to ensure that the participant is honest, and finally applying a sliding window to ensure that the selected competition leader is an honest participant who contributes consistently;

wherein the reputation score $r_i$ of participant i in step S23 is calculated by the formula:

$$r_i = \sum_{k=1}^{l} S(k) * Z(k);$$

wherein I is the number of transactions generated after the previous block, Z (k) is the value of transaction k, and S (k) is the scaling factor.

2. The blockchain-based multi-tenant distributed leasing method of claim 1, wherein the step S211 further comprises assigning resource IDs for different types of virtual network functions to identify:

$$\widetilde{ID} = \{id_1, id_2, \ldots, id_u\}; \tag{1}$$

for expected performance indexes on the demand side of the resource, use $\tilde{Q}_D$ to express:

$$\tilde{Q}_D = \{Q_1^D, Q_2^D, \ldots, Q_j^D, \ldots, Q_m^D\}; \tag{2}$$

wherein $$Q_j^D = \left\{ q_j^{D_{bit}}, q_j^{D_{loss}}, q_j^{D_{delay}} \right\}$$

denotes an expected performance of the resource required by a jth resource demander, and $$q_j^{D_{bit}}, q_j^{D_{loss}} \text{ and } q_j^{D_{delay}}$$

respectively denote requirements of bit rate, packet loss rate, and transmission delay proposed by the j-th resource demander; $id_u$ denotes identification of a virtual network function by a participant in a transaction, u denotes the total number of the virtual network function types, and m denotes a total number of resource demanders.

3. The blockchain-based multi-tenant distributed leasing method of claim 2, wherein S212 further comprises:

for a set of the satellite network resource providers L:

$$L = \{l_1, l_2, \ldots, l_i, \ldots, l_n\}: v_1^L \leq v_2^L \leq \ldots \leq v_n^L; \tag{3}$$

for a set of the resource demanders D:

$$D = \{d_1, d_2, \ldots, d_j, \ldots, d_m\}: v_1^D \geq v_2^D \geq \ldots \geq v_m^D; \tag{4}$$

wherein L denotes the satellite network resource providers, D denotes the resource demanders, $l_i$ denotes a i-th satellite network resource provider, $d_j$ denotes the j-th resource demander, $$v_n^L$$

denotes an offer price of a n-th satellite network resource provider, $$v_m^D$$

denotes an offer price of a m-th resource demander, and n denotes the number of satellite network resource providers.

4. The blockchain-based multi-tenant distributed leasing method of claim 3, wherein the point C in the step S213 further includes:

S offers and K bids, wherein prices on both sides of the point C satisfy:

$$v_K^D \geq v_S^L \text{ and } v_{K+1}^D \leq v_{S+1}^L; \tag{5}$$

and the number of transactions and the performance indexes respectively satisfy equation (6) and equation (7):

$$\sum_{j=1}^{K} N_j^D \leq \sum_{i=1}^{S} N_i^L; \tag{6}$$

-continued $$q_{min}^{bit} \times N_j^D \ge q_i^{D_{bit}} \text{ and } q_{min}^{loss} \times N_j^D \le q_i^{D_{loss}} \text{ and } q_{min}^{delay} \times N_j^D \le q_i^{D_{delay}}; \quad (7)$$

wherein $$q_{min}^{bit}, q_{min}^{loss} \text{ and } q_{min}^{delay}$$

respectively denote a minimum bit rate, packet loss rate, and transmission delay of each virtual network function resource provided by the satellite network resource provider, $$N_i^L$$

denotes a number of resources successfully traded by an i-th satellite network resource provider, and $$N_j^D$$

denotes a number of resources successfully traded by the j-th resource demander.

5. The blockchain-based multi-tenant distributed leasing method of claim 4, wherein the expression for the trader payment value β in S214 is:

$$\beta = \frac{1}{2} \times \left(v_{S+1}^L + v_{K+1}^D\right)\epsilon\left[v_i^L, v_j^D\right]; \quad (8)$$

wherein $$v_{S+1}^L$$

denotes the strongest price of a non-traded seller, and $$v_{K+1}^D$$

denotes the strongest price of a non-traded buyer;

①  if β belongs to $$\left[v_S^L, v_K^D\right],$$

the number of transactions is $$\left(\sum_1^{i=S} N_i^L, \sum_1^{j=K} N_j^D\right),$$

and the transaction price $P^L = P^D = \beta$, wherein $P^L$ and $P^D$ respectively denote final transaction prices agreed upon by the satellite network resource provider and the resource demander;

②  if β does not belong to $$\left[v_S^L, v_K^D\right],$$

the number of transactions is $$\left(\sum_1^{i=S} N_i^L, \sum_1^{j=K} N_j^D\right),$$

and the transaction price are $$P^L = v_S^L, P^D = v_K^D.$$

6. The blockchain-based multi-tenant distributed leasing method of claim 1, wherein the step S221 further comprises selecting a leader using the leader algorithm, wherein a sliding window is applied to compute a cumulative reputation score.

\* \* \* \* \*